United States Patent [19]

Kanamaru

[11] Patent Number: 5,129,797
[45] Date of Patent: Jul. 14, 1992

[54] EQUAL VELOCITY UNIVERSAL JOINT AND AXIAL PISTON PUMP MOTOR DEVICE USING THE JOINT

[75] Inventor: Hisanobu Kanamaru, Katsuta, Japan
[73] Assignee: Hitachi, Ltd., Tokyo, Japan
[21] Appl. No.: 703,848
[22] Filed: May 21, 1991

[30] Foreign Application Priority Data

May 21, 1990 [JP] Japan ................. 2-129088

[51] Int. Cl.$^5$ ............... F04B 1/24; F03C 1/06; F16D 3/48
[52] U.S. Cl. ............... 417/500; 92/71; 464/138; 464/904
[58] Field of Search ............... 91/499, 500; 464/50, 464/138, 106, 904; 92/68, 71

[56] References Cited

U.S. PATENT DOCUMENTS

| | | | |
|---|---|---|---|
| 981,736 | 1/1911 | Zock | 464/138 |
| 1,322,474 | 11/1919 | Allen | 464/138 X |
| 1,707,530 | 4/1929 | Meseroll | 464/138 X |
| 2,787,895 | 4/1957 | Kitselman | 464/50 X |
| 3,007,513 | 11/1961 | Aspelin | 91/500 X |
| 3,304,743 | 2/1967 | Paulsen | 464/72 |
| 3,656,408 | 4/1972 | Fox | 91/500 |
| 3,709,108 | 1/1973 | Alger, Jr. | 91/499 X |
| 4,223,594 | 9/1980 | Gherner | 91/499 X |
| 4,894,045 | 1/1990 | Kanamaru et al. | 464/138 |
| 4,982,651 | 1/1991 | Kanamaru et al. | 91/499 |
| 5,035,677 | 7/1991 | Kanamaru et al. | 464/138 |

FOREIGN PATENT DOCUMENTS 226578 10/1986 Japan ................. 91/499

Primary Examiner—Leonard E. Smith
Attorney, Agent, or Firm—Antonelli, Terry, Stout & Kraus

[57] ABSTRACT

An equal velocity universal joint is suitable for coupling shafts, driving and driven shafts, of mutual machines and for use in an axial piston pump motor device. One ends driving pins of the equal velocity universal joint rotate along a predetermined locus on a concentric circle while rotating and sliding by themselves in the cylinder bores of the driving or driven shaft. Spherical head portions of the other ends perform rotating motion in cylinder bores or ball receiving bores of the driving or driven shaft. Accordingly, the respective drving pins continue linear sliding motion in response to the rotation of the driving or driven shaft and thereby the spherical head portions of the other ends are held at the concentric circle on the driving or driven shaft so as to keep the driving center in floating state. As a result, the respective pistons are driven on a concentric circle, thereby an equal velocity universal joint is realized and the mechanical vibration thereof is substantially eliminated.

26 Claims, 5 Drawing Sheets

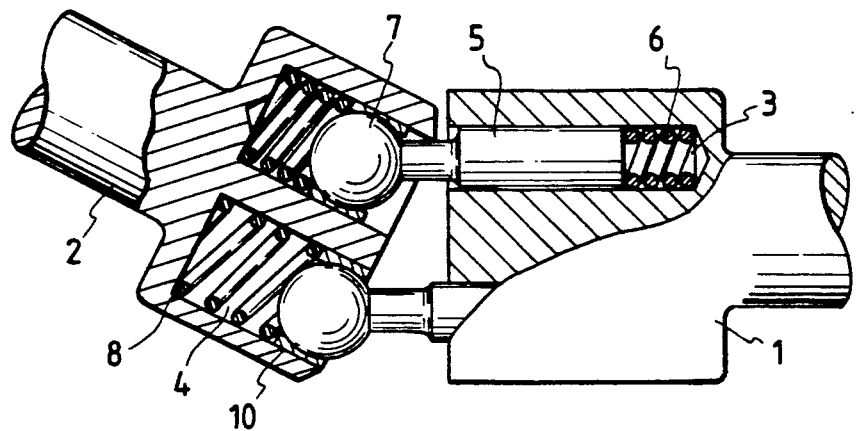
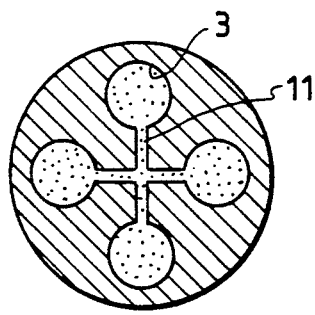
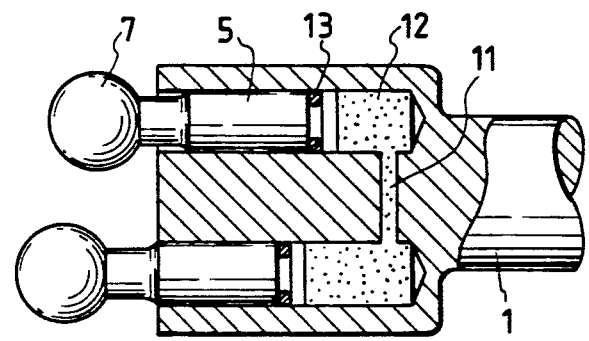
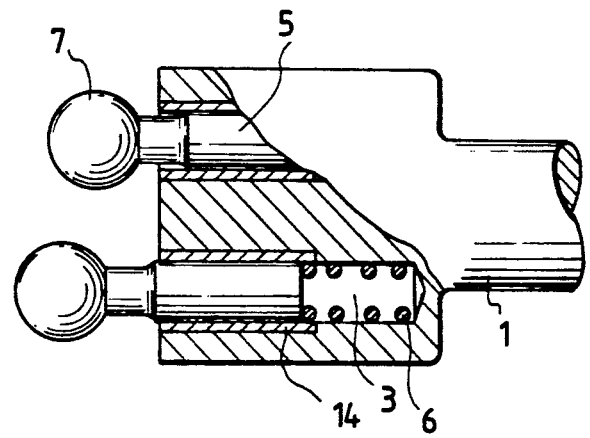

EQUAL VELOCITY UNIVERSAL JOINT AND AXIAL PISTON PUMP MOTOR DEVICE USING THE JOINT

BACKGROUDN OF THE INVENTION

The present invention relates to an equal velocity universal joint suitable for coupling rotating shafts (driving shafts) of mutual machines and to an axial piston pump motor device using the joint.

In a conventional universal joint, as disclosed in JP-A-63-308220 (1988), which corresponds to U.S. Pat. No. 4,894,045, a pair of driving pins are disposed between facing driving shafts while interposing a guide pin therebetween and one ends of the driving pins are constituted to be slidable in the axial direction and ther other ends thereof are shaped into spherical heads and are permitted free rotation and movement into radial direction.

Further, in a device applying a universal joint, as disclosed in JP-A-63-309785 (1988), which corresponds to U.S. Ser. No. 07/203,930, filed June 8, 1988, now U.S. Pat. No. 4,982,651 torque transmission between a cylinder block and a piston support disposed concentrically on the axis line of a driving shaft is effected by a pair of driving pins embedded along diagonal lines on the end face of the cylinder block and by a spherical bearing supported within a driving groove provided on the piston support, adapted to be freely movable on the driving pins and further freely movable in the radial direction within the driving groove.

The first and second conventional arts indicated above were constituted to cancel out the difference of pitch diameters of the driving pins which vary in response to variation of the inclination angle of the driving shaft (joint shaft). However, the rotating velocity of the driving shaft changes twice for every one rotation so that there arose a problem that rotation could not necessarily be transmitted with equal velocity.

JP-A-63-13921, filed by the same assignee of the present application and laid-open Jan. 21, 1988, discloses a universal joint including driving pins and a center guide pin. However, there are such problems with that universal joint that its inclined turn angle is limited and some mechanical loss is caused because of torque transmission via the wall face of the driving pin insertion bores.

U.S. Pat. No. 891,736 discloses a flexible joint for driving shafts in which a compression spring is disposed between the pair of driving shafts. However, the center of the joint can not be fixed so that when the inclination between the driving shafts is increased, the joint can not operate as an equal velocity joint because of its off-centering.

U.S. Pat. No. 1,322,474 also discloses a floating tool chuck, a kind of joint, in which no substantial sliding movement of the links is permitted so that no inclination between the shank member and drill member can be obtained.

SUMMARY OF THE INVENTION

An object of the present invention is to provide an equal velocity universal joint with a simple structure which enables the joint to transmit rotation with equal velocity even if inclination angle of a driving shaft changes.

Another object of the present invention is to provide an axial piston pump, motor device which enables driving of a cylinder barrel or a driving shaft with equal velocity even if the inclination angle of a piston support changes in response to rotation of the driving shaft.

The above one object of the present invention is achieved by a universal joint comprising driving pins disposed between a driving member and a driven member and mechanically coupling the two members, wherein the driving pins include at least three driving pins which are disposed at a common circle on the facing surfaces of the pair of driving and driven members, and each of these are rotatable, and one ends thereof are supported movable into their axial directions and the other ends thereof in the same direction are provided with spherical heads.

Further, the above another object of the present invention is achieved by a universal joint comprising driving pins disposed between a driving shaft and driving shaft and mechanically coupling the two shafts, wherein the pair of said driving and driven shafts are provided with cylindrical bores extending in parallel along their respected axes at a common circle on the facing surfaces thereon with a uniform distance therebetween. Each of the driving pins is formed of columnar body which is inserted and disposed in a cylindrical bore for either one of the driving and driven shafts via a compression spring and a spherical head portion thereof being inserted and disposed in the corresponding cylindrical bore for the other shaft via a compression spring.

Still further, the above another object is achieved by an axial piston pump motor device comprising a cylinder barrel accommodated in a housing and adapted to rotate in unison with a driving shaft and an inclined turn plate fixed on the side face of the housing and receiving a piston support, wherein one ends of the pistons in piston units disposed between the above piston support and the cylinder barrel and performing reciprocating motion are held at a common circle on the cylinder barrel while permitting each of these free rotation and movement into its axial direction and the other ends thereof having spherical head portions are held on the end face of the piston support while permitting thereof free rotation and as well a plurality of driving pins one ends of which are held on an innner concentric circle from the common circle for the pistons in the cylinder barrel while permittin each of these free rotation and movement into its axial direction. The other ends of the driving pins have spherical head portions held on the end face of the piston support while permitting thereto free rotation and movement into its axial direction.

The one ends of the driving pins of this equivelocity universal joint rotate along a predetermined locus on the concentric circle while each rotating and sliding by themselves in the cylinder bore of the driving or driven member. The shperical head portions of the other ends perform rotating motion in the cylinder bores or ball receiving bores of the driving or driven member. Accordingly, the respective driving pins continue linear sliding motion in response to the rotation of the driving or driven member and thereby the spherical head portions of the other ends are held at the concentric circle on the driving or driven member so as to keep the driving center in floating state.

As a result, the respective pistons are driven on a concentric circle, thereby an equal velocity universal joint is realized and the mechanical vibration thereof is substantially eliminated.

BRIEF DESCRIPTION OF THE DRAWINGS

FIG. 7 through FIG. 10 are respectively seectional views of other embodiments showing major parts of equal velocity universal joints according to the present invention;

DESCRIPTION OF THE PREFERRED EMBODIMENT

Figure 1:
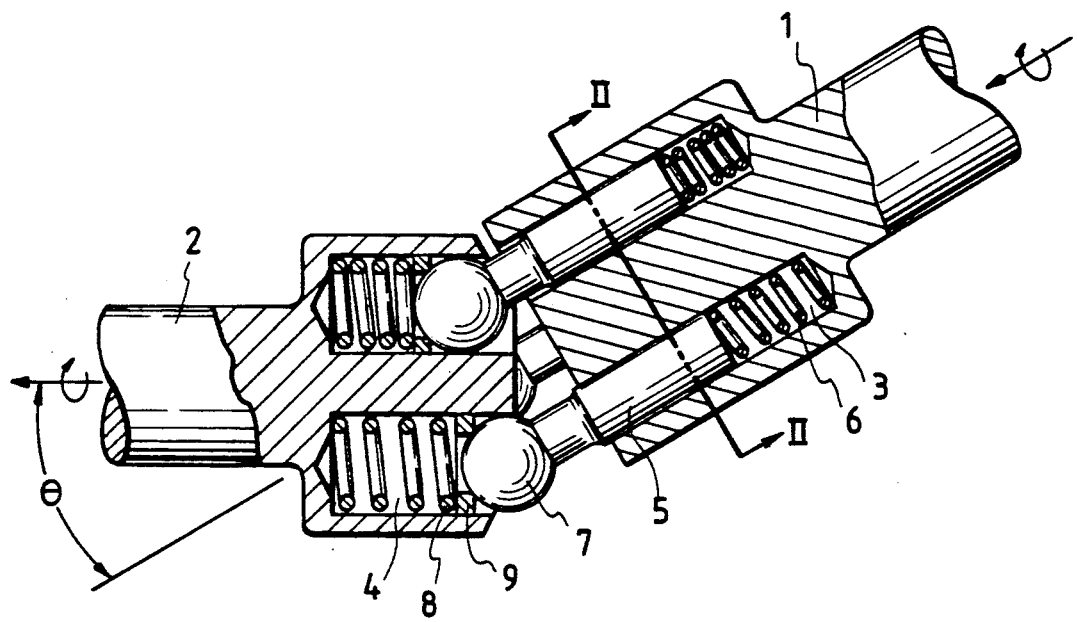
FIG. 1 is a sectional view of one embodiment showing a major part of an equal velocity universal joint according to the present invention.

Hereinbelow, the first embodiment of the present invention is explained with reference to FIG. 1 and FIG. 2.

Both an input shaft (driving member) 1, to which separately installed driving means is mechanically coupled, and an output shaft (driven member) 2, are produced via cold forging processing and cutting work, for example. the input shaft 1 is provided with four cylinder bores 3 opened at their one ends, extending parallel to the axis and formed at a concentric circle thereon with a uniform distance via a process as milling. The output shaft 2 is configured in the same manner, in that cylinder bores 4 are formed at the corresponding positions to the cylinder bores 3 on the opposing face.

One ends of driving pins 5 are respectively inserted and disposed in the cylinder bores 3 via compression springs 6, and in the same manner the other ends of spherical head portions 7 are respectively disposed in the open ends of the cylinder bores 4 in the output shaft 2 via compression springs 8. Herein, the compression forces of the compression springs 6 and 8 are selected to be substantially the same (compression springs having somewhat weaker compression force may be used for those at the output shaft side), and are balanced so as to always maintain the driving pins 5 at the center portion in floating state.

Further, spring seats 9 with a ring shape are disposed in such a manner that the compression springs 8 are not forced into between the space the spherical head portions 7 of the driving pins and the circumferential face of the cylinder bores to prevent the movement of the spherical head portions. However, when the shape of the spring or the relationship with the spherical head portions permits, the spring seats 9 can be omitted.

Figure 2:
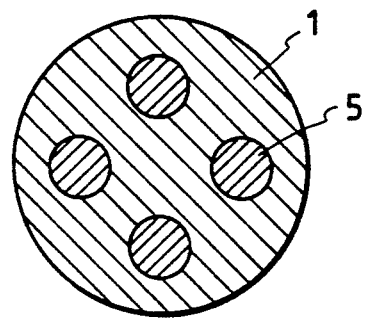
FIG. 2 is a cross sectional view taken along the line II—II in FIG. 1.

In the above construction, the four driving pings 5 are preferably arranged at a common concentric circle with a uniform distance as spacing between the pins as shown in FIG. 2. However, at least three driving pins are also satisfactory, and when an even number of the driving pins are selected and each pair of driving pins are arranged in opposing relation with respect to the center of the common circle, thereby a satisfactory balance of the driving pins is achieved. Further, the size of the spherical head portions 7 is determined depending upon the required mechanical strength. If necessary hardending processing and surface treatment processing such as titanium coating may be applied to the spherical head portions 7 and another material appropriate thereto may be used.

The input shaft 1 and the output shaft 2 are arranged with a predetermined inclined turn angle $\theta$ as shown in FIG. 1. When the input shaft 1 is rotated, the driving pins successively displace the compression springs 6 and 8 within the range from the maximum compression to the minimum compression thereof in response to the inclined turn positions and transmit a rotating driving force to the output shaft 2. At this instance, since the compression forces of the compression springs 6 and 8 are adjusted so as to always balance each other, the driving pins 5 move in their axial directions so as to always be located at the driving center in a floating state and the spherical head portions 7 always move along the locus on the concentric circle without fail, thereby a genuine equal velocity universal joint is realized.

Further, in this embodiment, however, when the inclined turn angle $\theta$ is more than 5°, the compression springs on the side of the spherical head portions are not necessarily needed because the cylindrical bores limit the axial movement of the spherical head portions.

In the above embodiment, four driving pins 5 are arranged along the concentric circle as shown. However, as noted above three of the driving pins are satisfactory and in case of odd number arrangement, an arrangement with a uniform pitch is preferable because of their desirable stress balancing.

FIG. 7 shows another embodiment of the present invention wherein spherical head portions 7 are inserted into cylinder bores 4 via slippers 10. The slipper 10 receive compression springs 8. Further, when slippers 10 with C-shape or half ring shape are used, the slippers 10 are assembled with the spherical head portions. Thereafter the assemblies are inserted into the respective cylinder bores. With this arrangement the sliding property of the spherical head portions is improved. The slippers further serve as the spring seats to thereby smooth the movement.

FIGS. 8 and FIG. 9 show another modification, wherein hydraulic pressure is used in place of the above indicated compression springs 6. The bottoms of cylinder bores 3 are connected by crossing passages 11 and liquid (oil) 12 is filled into the cylinder bores. In this instance, the piston units are provided with O rings 13 so as to prevent leakage of the liquid. Thereby, an equal velocity universal joint having a desirable compression balance and facilitating elimination of mechanical vibration to thereby reduce noise is obtained.

FIG. 10 shows another type of universal joint according to the present invention with compression springs 6 wherein bearing metals 14 are forced into the cylinder bores 3 for smoothing the slide of pistons 5. The pistons 5 are supported via the bearing metals 14. As a result desirable slide of the pistons is obtained to thereby reduce mechanical loss therein and as well to reduce noise.

Figure 3:
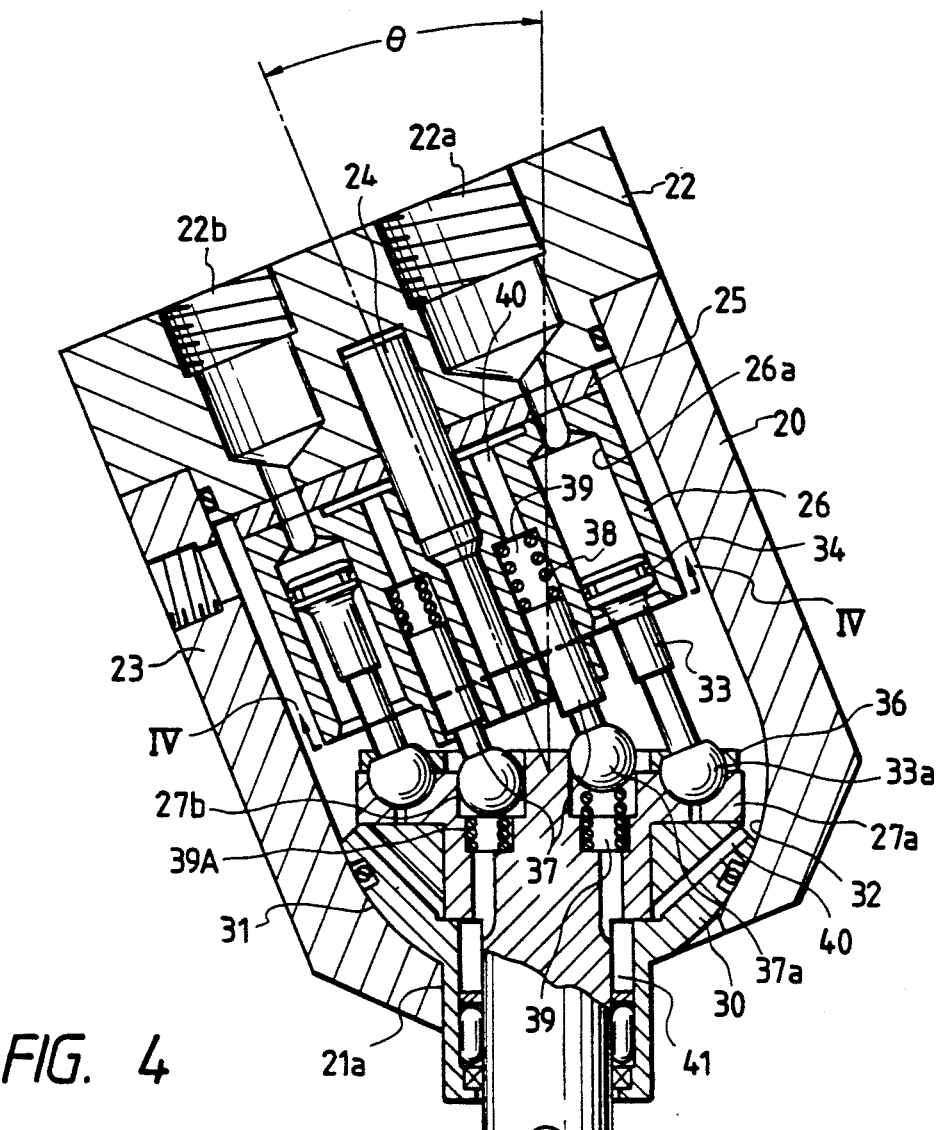
FIG. 3 is a partial vertical sectional view of an inclined shaft type piston pump motor device.
Figure 4:
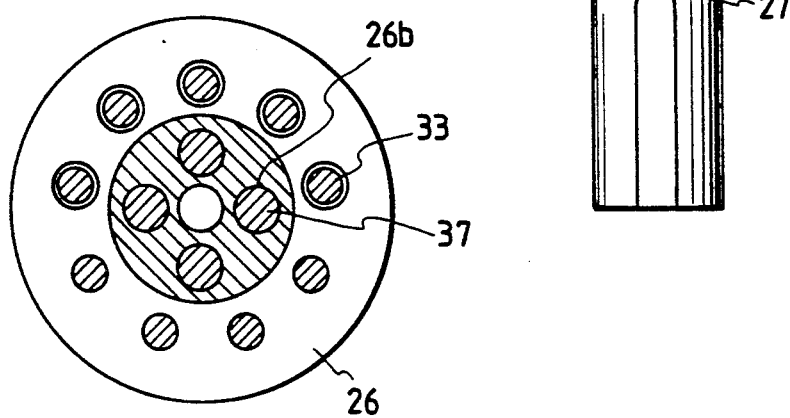
FIG. 4 is a cross sectional view taken along the lin IV—IV in FIG. 3.

Now, an embodiment using the above explained equal velocity universal joint is explained with reference to FIG. 3 through FIG. 6. Initially, FIG. 3 shows an inclined axis type piston pump device. A casing 20 of the pump is constituted by a side cover 22 including a suction port 22a, a delivery port 22b and a cup shaped housing 23 sealingly connected to the side cover 22. A cylinder pin 24 is embedded perpendicularly at the center of the side cover 22 extending toward its inner space. A cylinder barrel 26 is rotatably mounted to the cylinder pin 24 via a valve plate 25. The cylinder barrel 26 is formed of a columnar body and is provided with an even number (eight) of cylinder bores 26a formed along a common circle with a uniform distance. The bores 26a communicate with the suction part 22a or deliverly port. 22b via the valve plate 25. A plurality (four) of cylinder insertion bores 26b are formed along a concentric circle with respect to the central cylinder pin 24 with a uniform distance therebetween. A driving shaft 27 formed integrally with a piston support 27a is held on an inclined turn plate 30 via needle bearings while permitting free rotation thereof, and the inclined turn plate 30 is contacted via its half spherical surface 31 to the half spherical surface 32 of the housing 24.

Piston 33 are inserted into cylinder bores 26a, and rotatably disposed therein via seal rings 34. Spherical 1 head portions 33a at the other ends of the pistons are rotatably disposed on the piston support 27a and are held thereon by a pulling-off preventing plte 36.

Driving pins 37 are disposed along an inner concentric circle from that for the pistons 33, and the piston portions thereof are inserted into driving pin insertion bores 39 via compression springs 38. spherical head portions 37a of the pins 37 are inserted and disposed in ball receiving bores 27b formed on the end face of the piston support 27a via compression springs 36a. Further, the driving pin insertion bores 39 and the ball receiving bores 27b are provided with oil passages 40 and 41 at their respective bottoms to thereby improve their lubricating ability.

In the above constitution, when the driving shaft 27 is rotated, the rotating effort is transmitted to the cylinder barrel 26 via the piston support 27a and the driving pins 26, and the cylinder barrels rotated in synchronism with the driving shaft. On the other hand, the driving pins 37 and the pistons 33 begin to slide in their axial directions in association with their rotational movement due to the inclination of the piston support 27a, and the pistons 33 perform the suction-delivery operation via the valve plate 25.

In the above operation, the difference between the pitch circle of the cylinder bores 26a and the pitch circle of the spherical heads 33a, which is caused when the inclined turn angle θ is changed, is canceled out by free movement of the pistons 33. On the other hand, the corresponding difference is also canceled out by the sliding movement of the driving pins 37 in their axial directions, and thereby the driving force is smoothly transmitted from the driving shaft 27 to the cylinder barrel 26.

The pump unit of the present embodiment is a so called variable capacity type pump unit so that the piston stroke thereof can be optionally changed by shifting the driving shaft 27 into right and left to vary the delivery capacity. In FIG. 3, stopper 21a is provided at the portion of the maximum inclined turn angle 22° where one end of the inclined turn plate 30 is adapted to be stopped.

According to the present embodiment, although the driving pins 37 effect an elliptical motion, the spherical head portions move into their axial directions whereby no undesirable force is caused in the joint so that a smooth rotation thereof is achieved and mechanical vibration thereof is reduced. Further, the driving pins are separated from the capacitive delivery pistons so that a high output piston with low cost is obtained without unduly increasing the size of the device.

Figure 5:
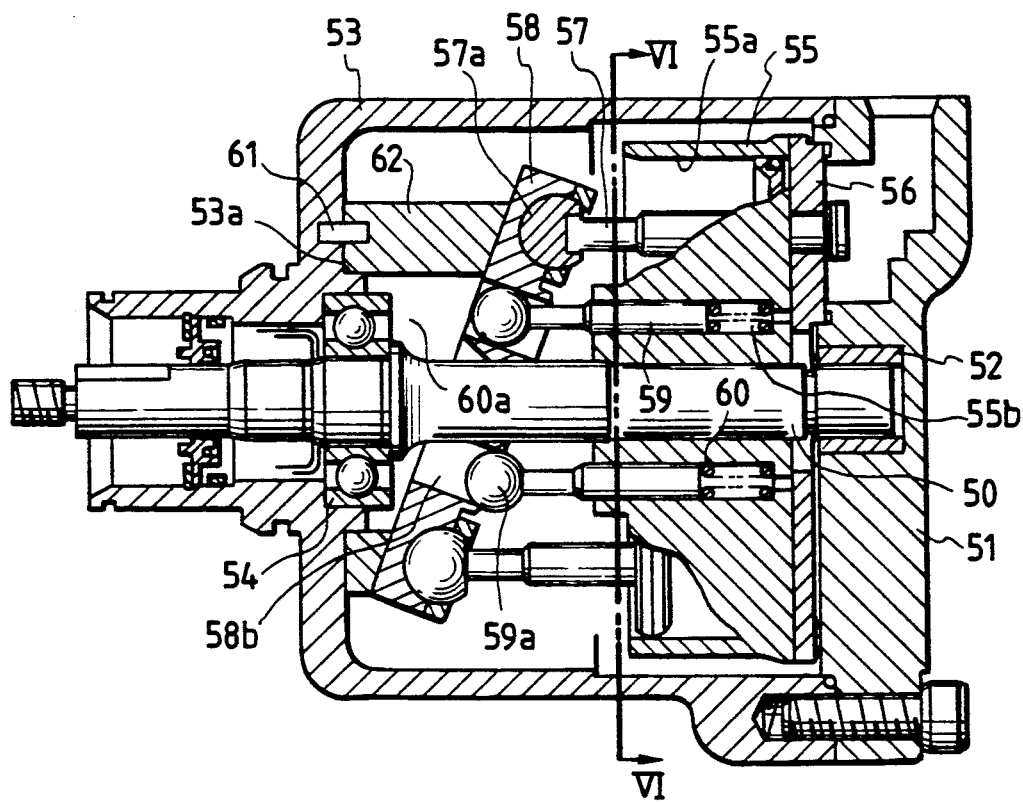
FIG. 5 is a partial vertical sectional view of a swash type piston pump motor device.

Next, one embodiment of a swash plate type piston pump for gas use is explained with reference to FIG. 5 and FIG. 6. As illustrated one end of a driving shaft 50 is supported on a side cover 51 via a bearing 52 and the other end thereof on a housing 53 via a bearing 54. On the one end portion of the driving shaft 50, a cylinder barrel 55 is disposed and secured via a valve plate 56 in the same manner shown in FIG. 3. A plurality of pistons 57 are inserted into cylinder bores 55a and the spherical head portions thereof are coupled and held on a piston support 58 concentrically suppored at the center of the driving shaft 50. Further, since the holding structure of the present embodiment is similar to that in the previous embodiment, the explanation thereof is omitted.

Figure 6:
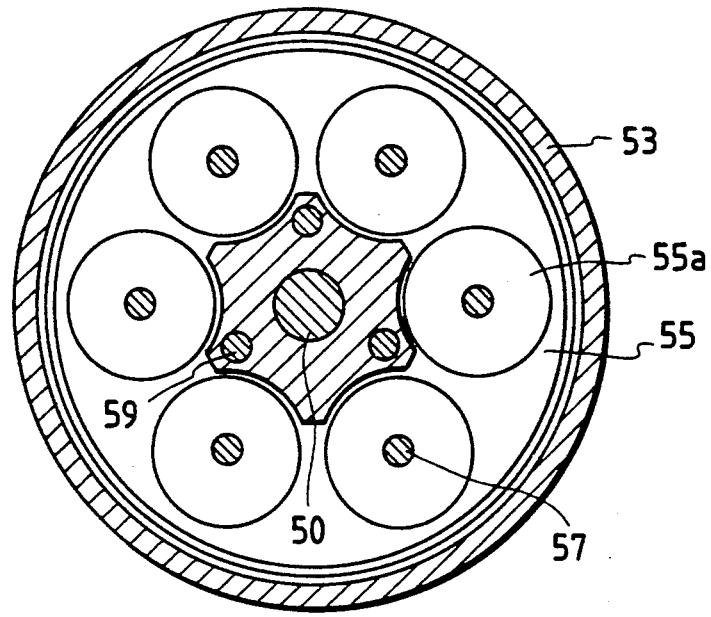
FIG. 6 is a cross sectional view taken along the line VI—VI in FIG. 5.

Driving pins 59 are disposed on an inner concentric circle from that for the pistons 57 as shown in FIG. 6. The piston portions of the driving pins are inserted into driving pin insertion bores 55b and spherical head portions 59a of the other ends of the driving pins are inserted and disposed in ball receiving bores 58b formed on the end face of the piston support 58.

An inclined turn plate 62 placed on the back face of the piston support 58 is a cylindrical body having a tapered face. The turn plate is fixed to the housing with, for example, pins (not shown) after the hollow portion 62a thereof is fitted onto a stepped face 53a of the housing 53 and is positioned thereon by means of a positioning pin 61.

In this kind of pump device, when the driving shaft 50 is driven, the cyclinder barrel 55 rotates in synchronism therewith, and the pistons are driven to rotate. Thereby, through the rotation the pistons perform a reciprocating motion to produce delivery pressure.

In this instance, when the cylinder barrel 55 is rotated, the driving pins 59 transmit rotating driving force to the piston support 58, and the driving pins 59 slide in response to the rotation angle and thereby the spherical head portions of the driving pins transmit the driving force along the concentric circle. Thereby, the present device achieves a synchronous rotation without applying any external force to the piston units which substantially determine the performance thereof. Further, it is preferable to prepare several kinds of inclined turn plates 62 having different inclination angles and to select one of them optionally depending upon required delivery capacity. Thus, according to the present embodiment, a small sized gas pressure pump with low noise and low cost is easily provided.

All of the above embodiments are effective for an equal velocity universal joint wherein the distance between the driving shaft and the driven shaft is kept unchanged. However, the embodiment shown in FIG. 11 through FIG. 13 is useful for an equal velocity universal joint wherein the load is applied in such a manner to reduce the distance between the driving shaft and the driven shaft.

Figure 11:
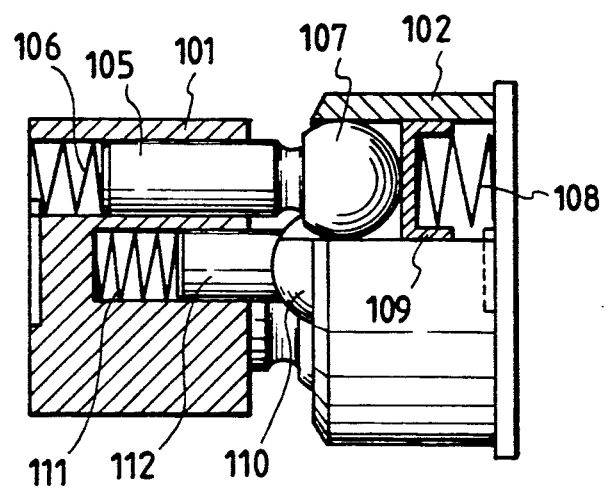
FIG. 11 is a partial vertical section view of still another embodiment of an equal velocity universal joint according to the present invention.
Figure 12:
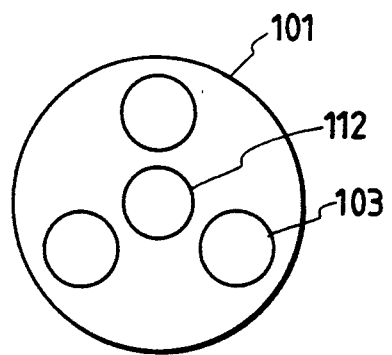
FIG. 12 is a side view of the driving pin in FIG. 11.
Figure 13:
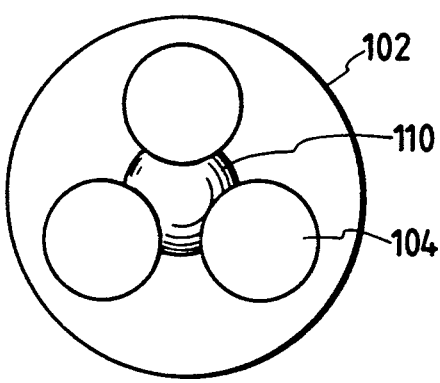
FIG. 13 is the driven pin in FIG. 11.

Like the previous embodiments, in the equal velocity universal joint of FIGS. 11-13 of driving shaft 101 and a driven shaft 102 are provided with cylinder bores 103 and 104. Driving pins 105 are inserted and disposed in the cylinder bores 103 and 104 via compression springs 106 and 108 and seats 109.

A significant difference from the previous embodiments is that the driven shaft 102 is provided with a half spherical shaped protrusion 110 at the center portion thereof and the driving shaft 101 is provided with a stopper pin 112 at the center thereof opposing to the protrusion 110 via compression spring 111.

In the above construction, the protrusion may be formed integrally with the driven shaft or may be formed separately and thereafter connected to the driven shaft. Further, when the dirving shaft 101 is formed of a synthetic resin, the stopper pin 112 is preferably made of metal and embedded in to the driving shaft 101, and when the driving shaft is made of metal, it is advantageous to form the stopper in integral with the driving shaft, in this instance the compression spring is omitted.

In the present embodiment, the stopper is provided at the center of both the driving shaft and driven shaft so as to limit their axial movement, thereby the inclined turn angle of this equal velocity universal joint is increased. The stopper is preferably shaped into a half spherical such that load applied to the shafts into the axial direction is concentrated to the center thereof thereby to keep the balance satisfactory. According to the present embodiment, an equal velocity universal joint is easily and surely obtained.

Generally, the casing including that of the first embodiment is formed of metal such as aluminum, however for the prupose of light weight, plastic may be used while achieving the objects of the present invention.

Further, it is needless to say that in the above embodiments even when the driving side is interchanged with the driven side the objects of the present invention are also achieved.

According to the present invention, the distortion stress due the rotation with nonuniform velocity of the driving pins is canceled out by the back and fourth movement of the driving pins, thereby resulting in an advantage that the rotation is transmitted with equal velocity even when the inclination angle of the driving shaft changes. Further, the rotating force is surely transmitted in synchronism so that loose gaps between the constituents are eliminated so that a product having such advantages as low vibration, low noise and simple strucure is realized.

I claim:

1. An axial piston pump-motor device comprising a cylinder barrel accommodated in a housing and rotating in unison with a driving shaft, a plurality of piston units accommodated in said cylinder barrel along an outer concentric circle thereon, an inclined turn plate fixed on a side face of said housing, a piston support rotatably received on said inclined turn plate, one ends of pistons of said piston units being held in respective cylinder bores formed in said cylinder barrel while permitting free rotation and axial movement thereof, and the other ends thereof having spherical head portions that are held on the end face of said piston support while permitting free rotation thereof, and a plurality of driving pins disposed between said cylinder barrel and said piston support and mechanically coupling the same, said driving pins being arranged on an inner concentric circle on said cylinder barrel wherein said one ends of the driving pins are columnar bodies which are inserted into respective bores formed in said cylindrical barrel via compression means while permitting free rotation and axial movement thereof and the other ends thereof having spherical head portions that are held on the end face of said piston support while permitting free rotation and axial movement thereof.

2. An axial piston pump-motor device comprising a cylinder barrel arranged with a predetermined inclined turn angle with respect to a driving shaft and rotated in synchronism with the rotation of said driving shaft, a plurality of piston units accommodated in said cylinder barrel along an outer concentric circle thereon, a piston support formed at the end of said driving shaft, one ends of pistons of said piston units are held in respective cylinder bores formed in said cylinder barrel while permitting free rotation and axial movement thereof and the other ends thereof having spherical head portions which are held on the end face of said piston support while permitting free rotation thereof, and a plurality of driving pins which are arranged on an inner concentric circle on said cylinder barrel, one ends of said driving pins are columnar bodies and inserted into respective cylinder bores formed in said cylinder barrel via compression means while permitting free rotation and axial movement thereof and the other ends thereof having spherical head portions are held on the end face of said piston support while permitting free rotation and axial movement thereof.

3. An axial piston pump-motor device according to claims 2, wherein said piston support is movably held on an inclined turn plate which is movably supported on an inside face of a housing of the device.

4. An equal velocity universal joint comprising driving pins disposed between a driving shaft and a driven shaft and mechanically coupling the shaft, said pair of driving shaft and driven shaft are formed of cylindrical bores located at the corresponding commom circles with an equal distance and extending parallel to their axes, and the respective driving pins have columnar body portions inserted and disposed in the cylindrical bores of one of said driving shaft and driven shaft via compression springs and spherical head portions formed at one ends of said columnar body portions are inserted and disposed in the cylindrical bores of the other shaft via compression springs.

5. An equal velocity universal joint according to claim 4, wherein the driving center of the spherical head portions is maintained in a floating state.

6. An equal velocity universal joint according to claim 5, wherein the driving pins are disposed at the corresponding common circles of the driving and driven shafts in a balanced condition.

7. An equal velocity universal joint comprising driving pins disposed between a driving member and a driven member and mechanically coupling the members, said pair of driving member and driven member are coupled by said plurality of driving pins arranged at a concentric circle on the facing surfaces of the members, one ends of said driving pins are slidably supported and the other ends thereof are supported so as to permit motion through spherical head portions thereof and slidable motion, and further comprising stopper means at the center of the members so as to limit the axial movement thereof.

8. An equal velocity universal joint according to claim 7, wherein said stopper means comprises a stopper of a half spherical shape, located on either one of said driving and driven members and a stopper pin facing the stopper and located on the other opposing member while permitting rotating movement thereof.

9. An equal velocity universal joint according to claim 8, wherein the stopper pin is disposed in the other opposing member via a compression spring while permitting sliding movement thereof.

10. An equal velocity universal joint according to claim 8, wherein the stopper pin contacts to the stopper via a spherical surface.

11. An equal velocity universal joint comprising driving pins disposed between a driving member and a driven member and mechanically coupling the members, wherein said pair of driving member and driven member are coupled by a plurality of said driving pins arranged at a concentric circle thereof, one ends of the driving pins are slidably supported and the other ends thereof are supported so as to permit motion through spherical head portions of the driving pins and slidable motion, wherein said one ends of the driving pins are columnar bodies which are inserted into respective cylindrical bores formed in said driving member via compression means.

12. An equal velocity universal joint according to claim 1, wherein said compression means is a compression spring.

13. An equal velocity universal joint according to claim 12, wherein the spherical head portions of said driving pins are disposed in cylindrical bores formed in said driven member via further compression means.

14. An equal velocity universal joint according to claim 13, wherein said further compression means is a compression spring.

15. An equal velocity universal joint according to claim 14, wherein said compression springs of the further compression means face the spherical head portions via slippers or spring seats.

16. An equal velocity joint according to claim 11, wherein said compression means is liquid filled into the cylindrical bores and said adjacent cylindrical bores are connected with each other via communicating passages.

17. An equal velocity universal joint according to claim 16, wherein the spherical head portions of said driving pins are disposed in cylindrical bores formed in said driven member via further compression means.

18. An equal velocity universal joint according to claim 17, wherein said compression means is a compression spring.

19. An equal velocity universal joint according to claim 18, wherein said compression springs of said further compression means face the spherical head portions via slippers or spring seats.

20. An equal velocity universal joint according to claim 11, wherein the columnar bodies of said driving pins are disposed in the cylindrical bores via bearings.

21. An equal velocity universal joint according to claim 20, wherein the spherical head portions of said driving pins are disposed in cylindrical bores formed in said driven member via further compression means.

22. An equal velocity universal joint according to claim 21, wherein said compression means is a compression spring.

23. An equal velocity universal joint according to claim 22, wherein said compression springs of said further compression means face the spherical head portions via slippers or spring seats.

24. An equal velocity universal joint according to claim 11, wherein the spherical head portions of said driving pins are disposed in cylindrical bores formed in said driven member via further compression means.

25. An equal velocity universal joint according to claim 24, wherein further compression means is a compression spring.

26. An equal velocity universal joint according to claim 25, wheren said compression springs of the further compression means face the spherical head portions via slippers or spring seats.

* * * * *